United States Patent
Bucknell et al.

(10) Patent No.: US 9,513,948 B2
(45) Date of Patent: Dec. 6, 2016

(54) AUTOMATED VIRTUAL MACHINE PROVISIONING BASED ON DEFECT STATE

(71) Applicant: International Business Machines Corporation, Armonk, NY (US)

(72) Inventors: Graham R. Bucknell, Frenchs Forest (AU); Robert Cen, Canley Vale (AU); Laurence A. Hey, Manly (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 14/614,794

(22) Filed: Feb. 5, 2015

(65) Prior Publication Data
US 2016/0232021 A1    Aug. 11, 2016

(51) Int. Cl.
*G06F 9/46*    (2006.01)
*G06F 9/455*    (2006.01)
(Continued)

(52) U.S. Cl.
CPC ....... *G06F 9/45558* (2013.01); *G06F 11/3668* (2013.01); *G06F 9/45533* (2013.01); *G06F 11/00* (2013.01); *G06F 2009/4557* (2013.01)

(58) Field of Classification Search
CPC ..... G06F 948/50; G06F 11/00; G06F 9/45533
See application file for complete search history.

(56) References Cited

U.S. PATENT DOCUMENTS 8,776,028 B1    7/2014    Enakiev et al.
2012/0159478 A1*    6/2012    Spradlin ............. G06F 11/3636
                                                                        718/1
(Continued)

FOREIGN PATENT DOCUMENTS

WO    2013162503 A1    10/2013

OTHER PUBLICATIONS

Mell et al., "The NIST Definition of Cloud Computing," National Institute of Standards and Technology, Information Technology Laboratory, Oct. 7, 2009, Version 15.

(Continued)

*Primary Examiner* — Camquy Truong
(74) *Attorney, Agent, or Firm* — Scully, Scott, Murphy & Presser, P.C.; Scott Dobson

(57) ABSTRACT

A method for automatically provisioning a virtual machine based on the state of a defect work-item workflow for reproducing a defect associated with testing a software product is provided. The method may include identifying a defect in the software product. The method may also include identifying steps to reproduce the defect. The method may include producing an automation script to reproduce the defect. The method may include identifying a plurality of relevant environmental details associated with a state of the defect. The method may also include requesting a virtual machine provisioning system to provision a new virtual machine comprising the plurality of relevant environmental details and the produced automation script. Also, the method may include building the new virtual machine. The method may further include informing the defect tracking system that the new virtual machine is ready and including a plurality of updated machine connection details and a defect description.

17 Claims, 6 Drawing Sheets

(51) Int. Cl.
    *G06F 11/36*         (2006.01)
    *G06F 11/00*         (2006.01)

(56)         References Cited

U.S. PATENT DOCUMENTS

| | | |
|---|---|---|
| 2013/0139128 A1 | 5/2013 | Jones et al. |
| 2013/0326510 A1 | 12/2013 | Adekile et al. |
| 2014/0033179 A1* | 1/2014 | Gustus .............. G06F 11/3664 717/127 |
| 2014/0325486 A1* | 10/2014 | Zhang .............. G06F 11/3692 717/125 |

OTHER PUBLICATIONS

Rational Quality Manager, "New & Noteworthy," Jazz Community Site, Jun. 7, 2013, p. 1-18, Rational Quality Manager Version 4.0.3, https://jazz.net/downloads/rational-quality-manager/releases/4.0.3?p=news#TOC_C, Accessed on: Dec. 9, 2014.

* cited by examiner

AUTOMATED VIRTUAL MACHINE PROVISIONING BASED ON DEFECT STATE

BACKGROUND

The present invention relates generally to the field of computers, and more particularly to software development.

A software development environment includes software testing to detect a defect in a software product. When a tester finds a defect or error in the software product, it is usually accompanied by reproduction steps so that the software developer (who is tasked to fix the detected problem) will be able to recreate the defect or error found by the software tester. A defect description is typically included with the reproduction steps. The defect description includes environmental details, such as which version of the build the defect was found and on which operating system the defect was observed. This information received by the software developer may allow the software developer to fully understand the context with which the defect occurred. As such, this information is received by the software developer is essential to understanding and fixing the defect.

SUMMARY

According to one embodiment, a method for automatically provisioning a virtual machine for replicating or reproducing a defect workflow stage associated with testing a software product is provided. The method may include identifying a defect in the software product. The method may also include identifying steps to reproduce the identified defect. The method may further include producing an automation script to reproduce the identified defect based on the identified steps. The method may include identifying a plurality of relevant environmental details associated with a state of the identified defect. The method may also include requesting, by a defect tracking system, a virtual machine provisioning system to provision a new virtual machine comprising the identified plurality of relevant environmental details along with an embedded script comprising the produced automation script. Also, the method may include building, by the virtual machine provisioning system, the requested new virtual machine. The method may further include informing, by the virtual machine provisioning system, the defect tracking system that the new virtual machine is ready and including a plurality of updated machine connection details associated with the new virtual machine and a defect description.

According to another embodiment, a computer system for automatically provisioning a virtual machine for replicating or reproducing a defect workflow stage associated with testing a software product is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a defect in the software product. The method may also include identifying steps to reproduce the identified defect. The method may further include producing an automation script to reproduce the identified defect based on the identified steps. The method may include identifying a plurality of relevant environmental details associated with a state of the identified defect. The method may also include requesting, by a defect tracking system, a virtual machine provisioning system to provision a new virtual machine comprising the identified plurality of relevant environmental details along with an embedded script comprising the produced automation script. Also, the method may include building, by the virtual machine provisioning system, the requested new virtual machine. The method may further include informing, by the virtual machine provisioning system, the defect tracking system that the new virtual machine is ready and including a plurality of updated machine connection details associated with the new virtual machine and a defect description.

According to yet another embodiment, a computer program product for automatically provisioning a virtual machine for replicating or reproducing a defect workflow stage associated with testing a software product is provided. The computer program product may include one or more computer-readable storage devices and program instructions stored on at least one of the one or more tangible storage devices, the program instructions executable by a processor. The computer program product may include program instructions to include identify a defect in the software product. The computer program product may also include program instructions to identify steps to reproduce the identified defect. The computer program product may further include program instructions to produce an automation script to reproduce the identified defect based on the identified steps. The computer program product may include program instructions to identify a plurality of relevant environmental details associated with a state of the identified defect. The computer program product may also include program instructions to request, by a defect tracking system, a virtual machine provisioning system to provision a new virtual machine comprising the identified plurality of relevant environmental details along with an embedded script comprising the produced automation script. Also, the computer program product may include program instructions to build, by the virtual machine provisioning system, the requested new virtual machine. The computer program product may further include program instructions to inform, by the virtual machine provisioning system, the defect tracking system that the new virtual machine is ready and including a plurality of updated machine connection details associated with the new virtual machine and a defect description.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
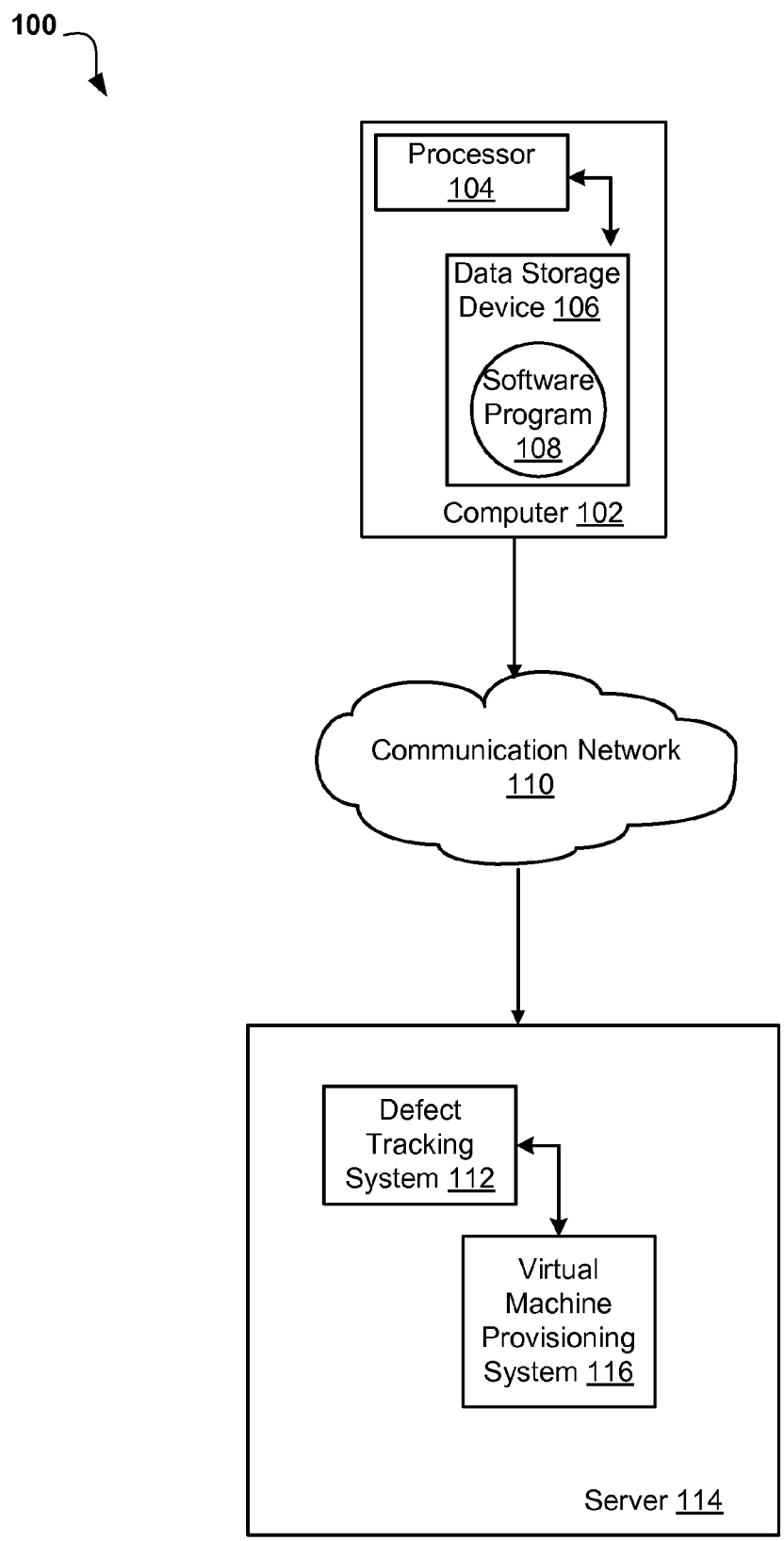
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to software development. The following described exemplary embodiments provide a system, method and program product to, among other things, provide an automated virtual machine (VM) provisioning based on a defect in a workflow stage. Additionally, the present embodiment has the capacity to improve the technical field of software development by connecting a defect tracking system with a virtual machine provisioning system to automatically provision a virtual machine for replicating or reproducing a defect workflow stage associated with testing a software product.

As previously described, when a tester finds a defect or error in the software product, it is usually accompanied by reproduction steps and a defect description so that the software developer will be able to recreate the defect or error found by the software tester. As such, in an effort to fix the detected defect, the developer will be required to build a system that conforms to the information described in the defect. Building the system is necessary in order for the developer to be able to work on the actual problem and fix the defect. However, there may be a significant delay if the system that needs to be built is complex. Therefore, to assist with the necessary effort of building the system, the tester may include the actual machine connection details in the defect, however in practice, the correct state (i.e., defect state) of the machine may be difficult to achieve. Therefore, in geographically dispersed teams, building the system may be a major inhibitor in defect turnaround times, as a full day may pass while connection details are sent back and forth between team members. For example, the shared machine may be inadvertently stopped, the password changed, or the firewall ports may need to be opened. Additionally, there may be associated machines, such as databases, servers, etc., that the developer may need to have access to, however the tester may have failed to provide such access to the developer. As such, it may be advantageous, among other things, to implement a method where an automated virtual machine provisioning is provided based on the state (e.g., open/working/verify/closed state corresponding to the record) when a defect is detected in a workflow stage.

The present embodiment may automatically provision a virtual machine for replicating/reproducing a defect state on identifying the defect. More specifically, the present embodiment may include a feature of building a new virtual machine with a detected defect description (environmental details/machine connection details in the defect) and informing the developer once the virtual machine is ready with the defect description and machine connection details.

Furthermore, the present embodiment may programmatically monitor the state of a defect or work-item in a work planning tool and on state change may provision virtual machines or environments that match the current state of the defect using a VM provisioning system. The monitoring state may include details such as the operating system; the database; the application version and the build or other non-functional environmental prerequisites for reproducing the defect; the current assignee of the defect; any associated product source code changes and builds in which they were included; the workflow stage of the defect; and one or more test-cases used to reproduce/verify the defect. Additionally, the present embodiment may add a link/reference to the provisioned VM in the defect/work-item. As such, the link may be updated each time the VM is re-provisioned. Also, the present embodiment may use a test-runner to run the test-cases associated with the defect/work-item and VM snapshots may be taken before and after running the test-case on the VM.

According to at least one implementation, the present embodiment may provide the tracking of a workflow and the changing state, such as updated product builds or changing defect owners of the defect or work-item and provisioning updated systems in response to the changes. As such, the present embodiment may ensure that the provisioned system may reflect the latest state of the defect and that the provisioned system is assigned to the appropriate individual.

More specifically, the present embodiment may connect a defect tracking system with a virtual machine provisioning system. As such, when a tester raises a defect, the tester may be prompted for the environmental details and optionally a "reproduction steps" script that reproduces the defect in question. Then, the virtual machine provisioning system may build a new virtual machine with the same environmental details as in the defect, run the reproduction steps, notify the developer, and update the defect description. Therefore, the developer may be able to connect to the new virtual machine, see the defect, and fix the defect. As such, the developer may not have to spend the time and labor building the reproduction environments since the reproduction environments may be built transparently and in the background at the precise time and state of the machine when the defect occurred.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide automated virtual machine provisioning based on a defect in a workflow stage. Embodiments of the present invention may provide a virtual machine provisioning system to build a machine at the precise time and state, such as the open, working, verify, or closed state of the record when the error was discovered. Additionally, the present embodiment may build the machine with the same environmental details in the defect, run the reproduction steps, notify the developer and update the defect description without the developer having to waste time and labor building reproduction environments. As such, various implementations of the present embodiment may include taking a virtual machine snapshot that captures the environment state before and after running an automated test case and attaching the snapshot to a workitem in a defect tracking system.

According to at least one implementation of the present embodiment, a tester may find a defect in a software product and identify the steps to reproduce the defect. Additionally the present embodiment may produce an automation script to reproduce the defect. Then, the tester may identify relevant environmental details and open a defect attaching the necessary information. The defect is then assigned to a developer. According to the present embodiment, a defect tracking system may call a virtual machine provisioning system and direct the virtual machine provisioning system to provision a new machine with all the environmental details and embeds the automation script that reproduces the defect at runtime. Then, based on the received environment details and automation script, the virtual machine provisioning system may build a new machine (e.g., vm-A). Once the new machine (e.g., vm-A) is built, the virtual machine provisioning system may inform the defect tracking system that the new machine is ready and the defect is updated with the machine connection details. As such, the developer may then be able to see the updated defect, connect to the new machine with the build exhibiting the defect and fix the defect. The defect then may be marked as fixed by the developer and the developer may nominate the build that the defect is fixed in.

Additionally, according to an alternate implementation, the defect tracking system may request the virtual machine provisioning system to delete the original VM (vm-A) and to build a new VM (vm-B) with the nominated fixed build. Then, the defect tracking system may update the defect with the connection details to the new virtual machine. Therefore, the tester may see the updated defect, connect to the new machine with the fixed build, and may verify the defect is fixed. As such, the tester may change the defect state to "verified" and then the defect tracking system may request the virtual machine provisioning system to delete the new VM (vm-B).

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run a Virtual Machine Provisioning System 116 that interacts with a defect tracking system 112, and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Defect Tracking System 112 and the Virtual Machine Provisioning System 116 running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a server 114.

As previously described, the client computer 102 may access the Defect Tracking System 112 or the Virtual Machine Provisioning System 116, running on server computer 114 via the communications network 110. For example, a user using an application program 108 (e.g., Firefox®) (Firefox and all Firefox-based trademarks and logos are trademarks or registered trademarks of Mozilla and/or its affiliates) running on a client computer 102 may connect via a communication network 110 to the Defect Tracking System 112 or the Virtual Machine Provisioning System 116 which may be running on server computer 114. As previously described, the Defect Tracking System 112 may programmatically monitor the state of a defect or the state of another work-item in a software product, such as a software planning tool. On state change, the present embodiment may provision virtual machines or environments matching the current state of a defect using the Virtual Machine Provisioning system 116. The Defect Tracking System method and the Virtual Machine Provisioning System method are explained in more detail below with respect to FIGS. 2A-2B.

Figure 2A:
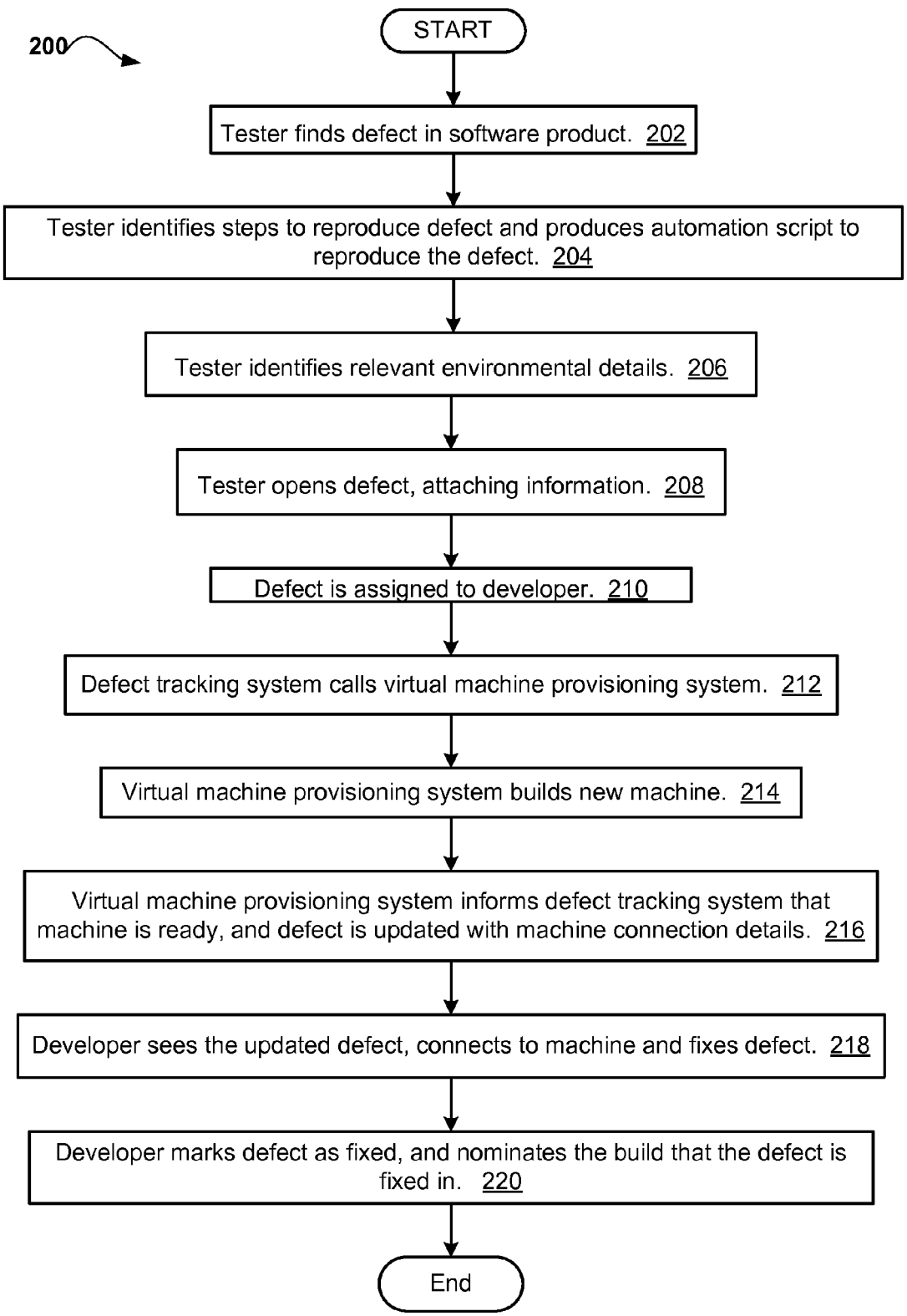
FIGS. 2A-2B is an operational flowchart illustrating the steps carried out by a program for provisioning a virtual machine based on a defect in a workflow stage according to at least one embodiment.
Figure 2B:
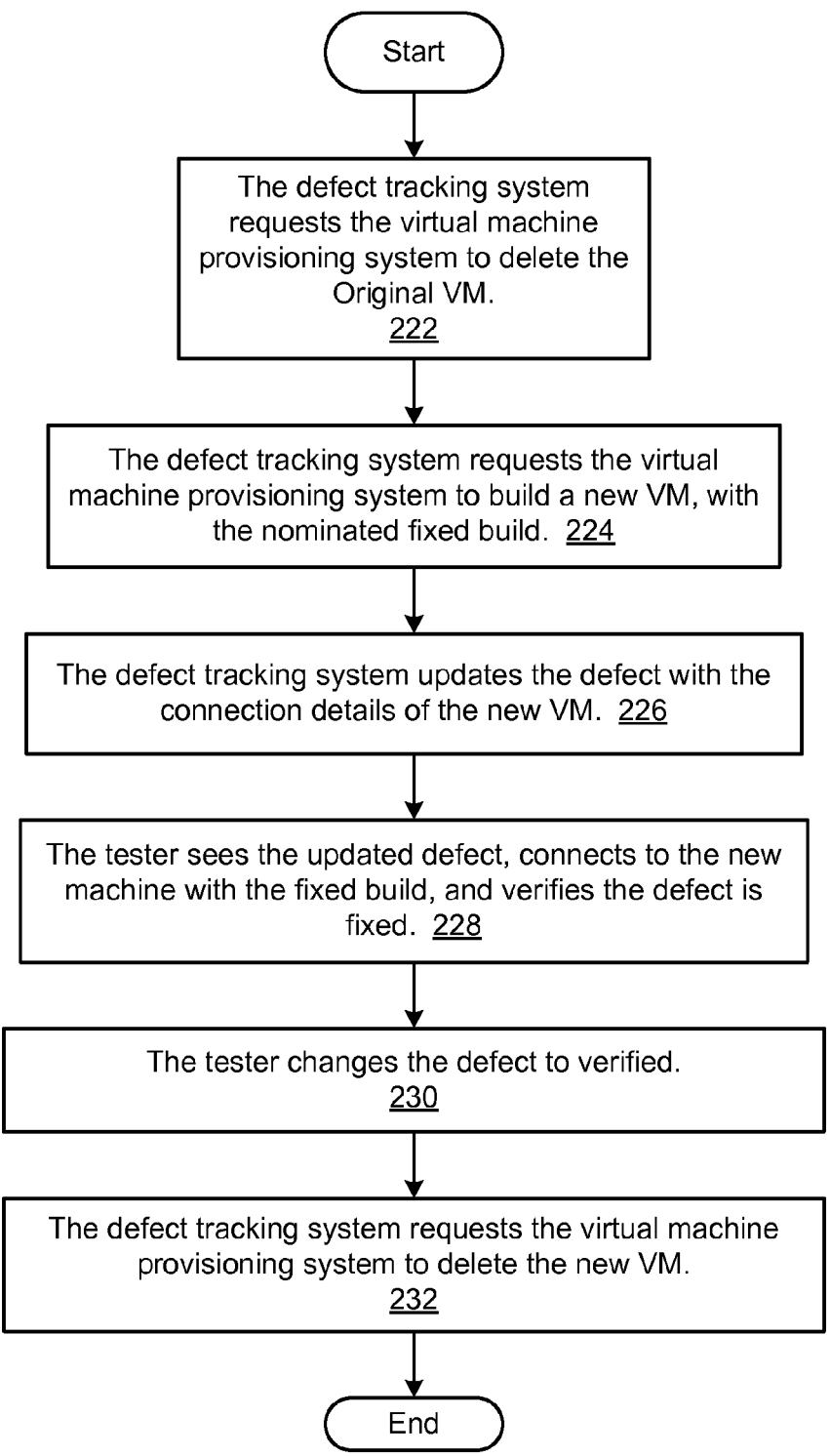

Referring now to FIGS. 2A-2B, an operational flowchart 200 illustrating the steps carried out by a program for provisioning a virtual machine based on a defect in a workflow stage according to at least one embodiment is depicted. As previously described, the present embodiment may monitor the state of a defect (or other work-item) and may provision VMs matching the current state of the defect when the defect was detected. The captured state may include information, such as the operating system, the database, the application version, and the build or other non-functional environmental prerequisites for reproducing the defect. Furthermore, the captured state may also include the current assignee of the defect, such as the developer or tester depending on the state; any associated product changes, and product builds in which they were included; the workflow stage, such as whether the record was in an open, working, verify, or closed state when the defect was detected; and optionally, the test-case used to reproduce or verify the defect. As such, using the state system may enable a VM to be provisioned matching the requirements and changing state of the work-item/defect. Therefore, as the workflow state changes, or new product builds are generated, new VMs/servers may be provisioned allowing a developer or tester to quickly debug or verify the defect.

With respect to FIG. 2A at 202, a tester finds a defect in a software product. For example, a tester using a client computer 102 (FIG. 1) may be testing a software product 108 (FIG. 1) and discover a defect in the software product 108 (FIG. 1). Next at 204, the tester may identify the steps to reproduce the defect and additionally, may produce an automation script to reproduce the defect. According to at least one implementation, when a tester raises a defect, the tester may be prompted for the environmental details pertaining to the defect and the reproduction steps that may reproduce the defect in question. For example, the tester may be prompted via a graphical user interface to provide environment details pertaining to the identified defect.

Then at 206, the tester may identify the relevant environmental details. For example, the tester may identify environmental details, such as the operating system, the database, the application version, and the build or other non-functional environmental prerequisites for reproducing the defect. Furthermore, the tester may also include the current assignee of the defect, such as the developer or tester depending on the state; any associated product changes, and product builds in which they were included; the workflow stage, such as whether the record was in an open, working, verify, or closed state when the defect was detected; and the test-case used to reproduce or verify the defect.

Next at 208, the tester may open a defect attaching the necessary information. As such, the tester may open a defect and attach the information previously identified in step 206 described above. Then at 210, the defect is then assigned to a developer. Therefore, the defect and the identified necessary information attached to the defect may be assigned to a developer.

Next at 212, the defect tracking system 112 (FIG. 1) may call the virtual machine provisioning system 116 (FIG. 1) and direct the virtual machine provisioning system 116 (FIG. 1) to provision a new machine with all the environmental details (previously identified in step 206) and embed the automation script that reproduces the defect into runtime.

Then at 214, based on the received environment details and automation script, the virtual machine provisioning system 116 (FIG. 1) may build a new machine (e.g., vm-A). Next at 216, after the new machine (e.g., vm-A) is built, the virtual machine provisioning system 116 (FIG. 1) informs the defect tracking system 112 (FIG. 1) that the new machine is ready and the defect is updated with the machine connection details.

Then at 218, the developer may be able to see the updated defect, connect to the new machine and fix the defect. Next at 220, the defect then may be marked as fixed by the developer and the developer may nominate the build that the defect is fixed in.

FIG. 2B illustrates an alternate implementation with optional steps to automatically produce a before and after state of the VM. As such, two VMs may be provisioned where the test case may be run on one VM, or by taking VM snapshots before and after running the test case. As a result, the before and after state may be helpful in debugging the cause of the defect.

With respect to FIG. 2B at 222, the defect tracking system 112 (FIG. 1) may optionally request the virtual machine provisioning system 116 (FIG. 1) to delete the original VM (e.g., vm-A). Then at 224, the defect tracking system 112 (FIG. 1) may request the virtual machine provisioning system 116 (FIG. 1) to build a new VM (e.g., vm-B) with the nominated fixed build.

Next at 226, the defect tracking system 112 (FIG. 1) may update the defect with the connection details to the new VM (e.g., vm-B). Then at 228, the tester may see the updated defect, connect to the new machine (e.g., vm-B) with the fixed build, and may verify the defect is fixed. As such, at 230, the tester may change the defect state to "verified" and then the defect tracking system 112 (FIG. 1) may request the virtual machine provisioning system 116 (FIG. 1) to delete the new VM (vm-B) at 232.

It may be appreciated that FIGS. 2A-2B provide only an illustration of one implementation and does not imply any limitations with regard to how different embodiments may be implemented. Many modifications to the depicted environments may be made based on design and implementation requirements. For example, as previously described with respect to an alternate implementation, the defect tracking system may request the virtual machine provisioning system to delete the VM and to build a new VM with the nominated fixed build. Furthermore, the virtual machine may optionally be provisioned in the developer's or tester's location for low latencies. Additionally, the relationship between the developer and the tester could rather be a relationship between a support professional and a customer.

Figure 3:
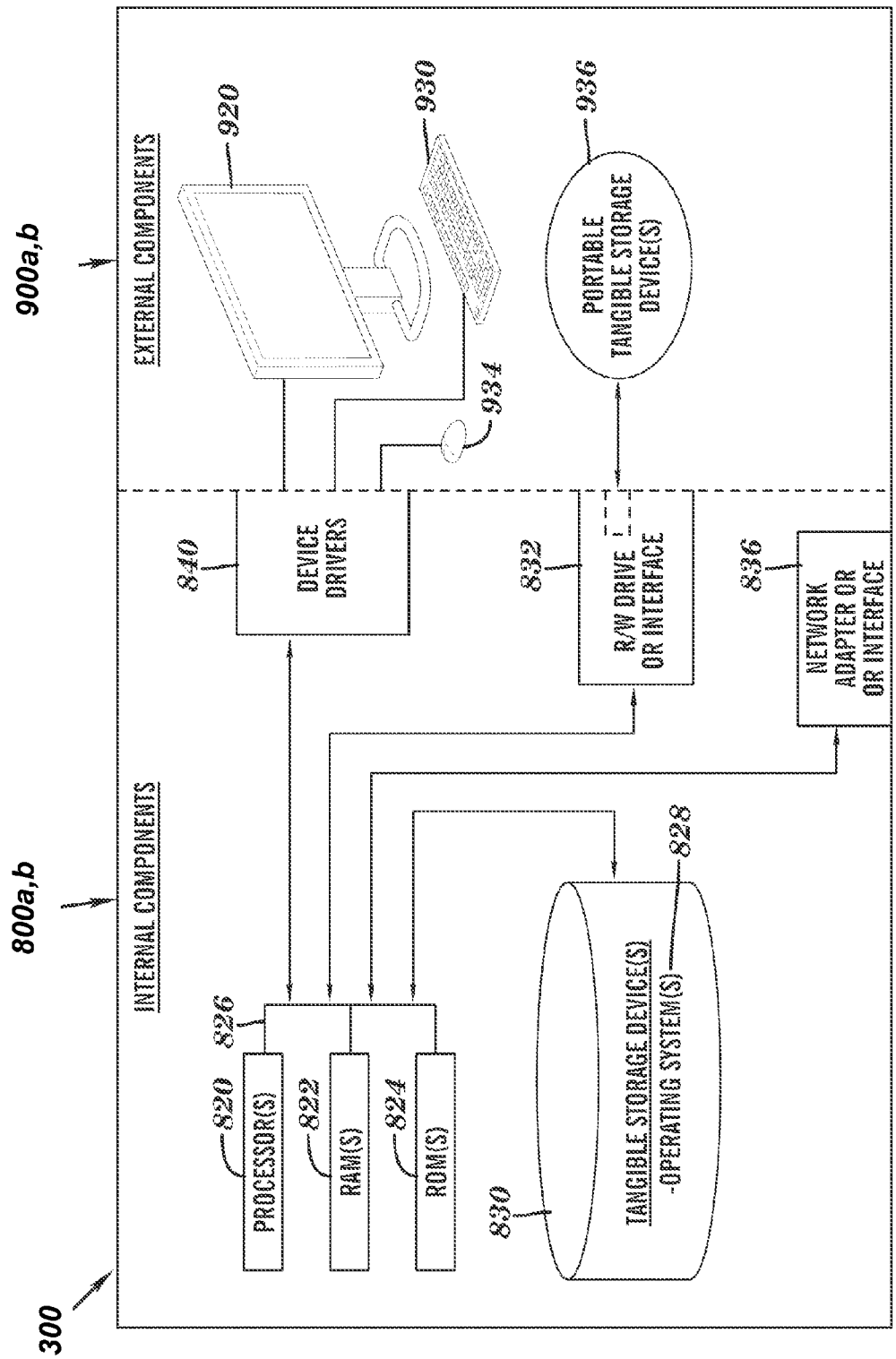
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) in client computer 102 (FIG. 1) and the Defect Tracking System 112 (FIG. 1) and the Virtual Machine Provisioning System 116 (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1), the Defect Tracking System 112 (FIG. 1) and the Virtual Machine Provisioning System 116 (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) in client computer 102 (FIG. 1) and the Defect Tracking System 112 (FIG. 1) and the Virtual Machine Provisioning System 116 (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) in client computer 102 (FIG. 1) and the Defect Tracking System 112 (FIG. 1) and the Virtual Machine Provisioning System 116 (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-Demand Self-Service: a cloud consumer can unilaterally provision computing capabilities, such as server time and network storage, as needed automatically without requiring human interaction with the service's provider.

Broad Network Access: capabilities are available over a network and accessed through standard mechanisms that promote use by heterogeneous thin or thick client platforms (e.g., mobile phones, laptops, and PDAs).

Resource Pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid Elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: the cloud infrastructure is operated solely for an organization. It may be managed by the organization or a third party and may exist on-premises or off-premises.

Community Cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling cloud services.

Hybrid Cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
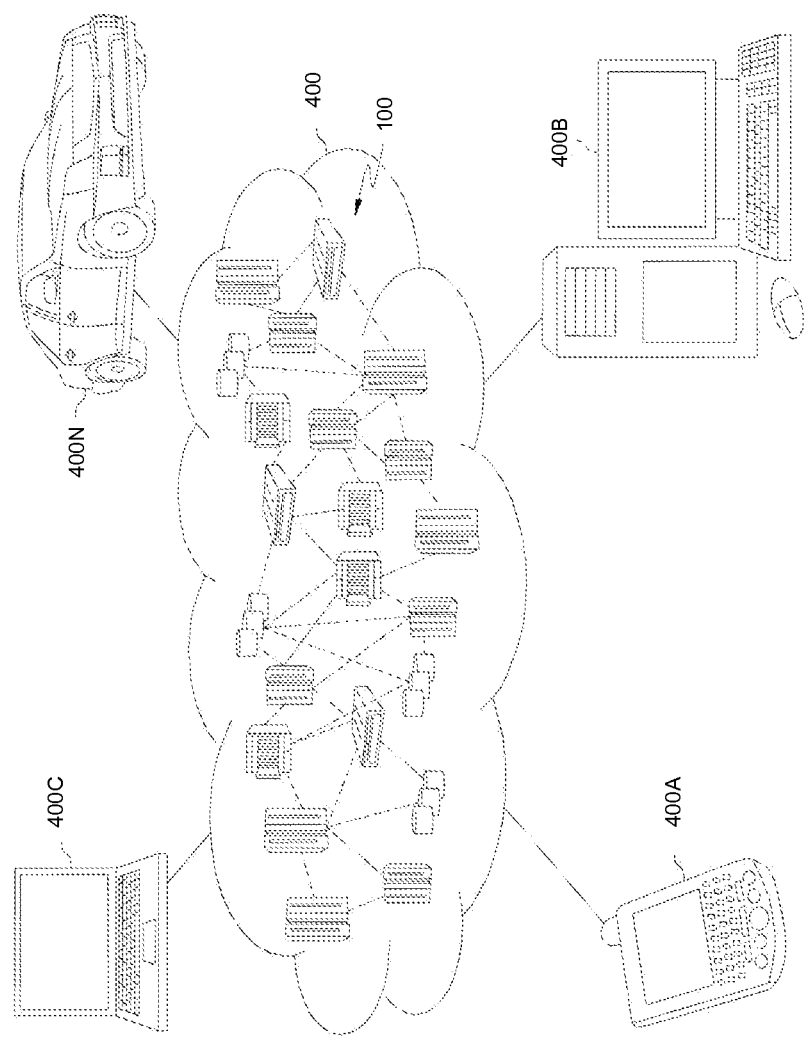
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
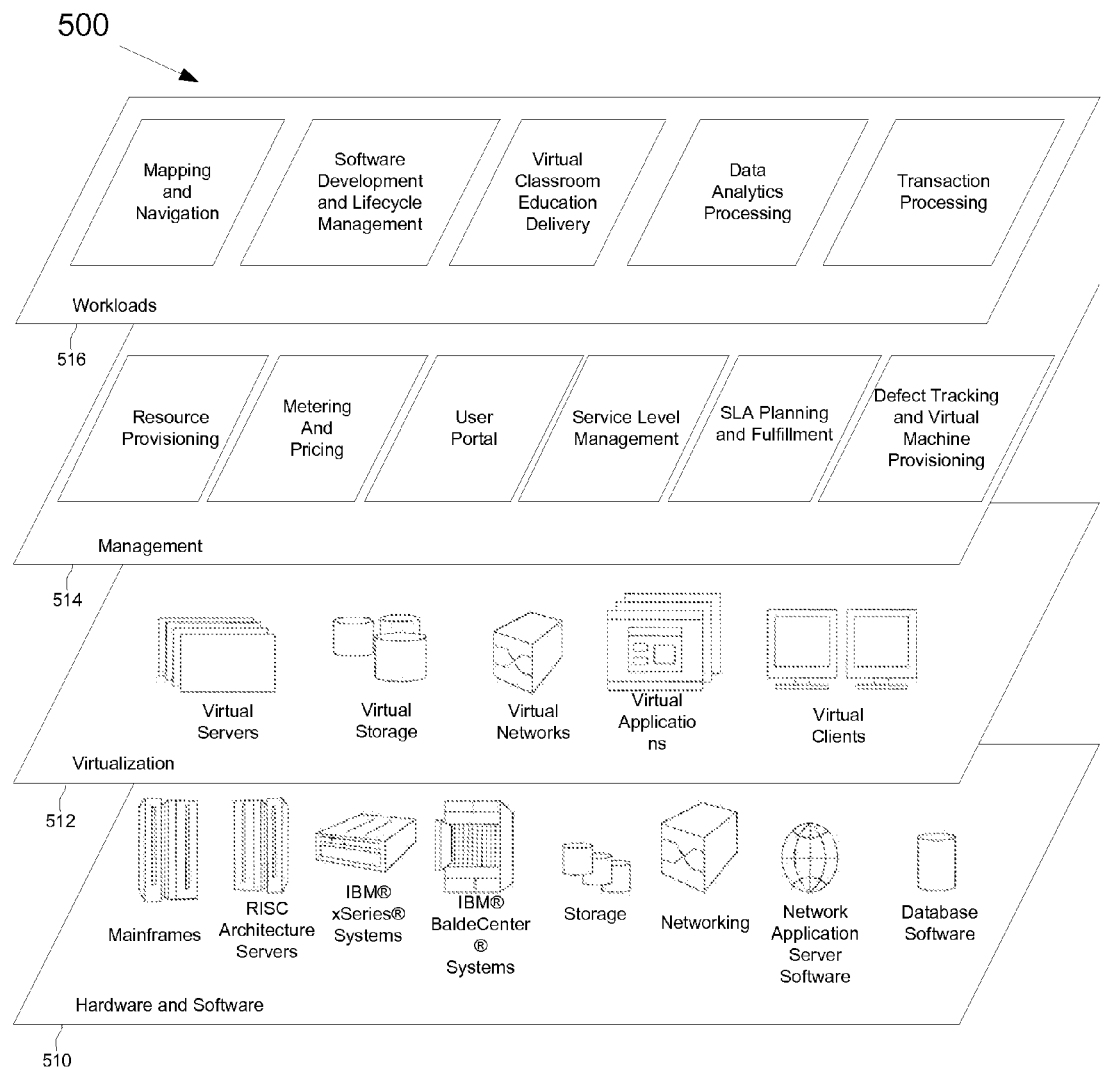
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes; RISC (Reduced Instruction Set Computer) architecture based servers; storage devices; networks and networking components. In some embodiments, software components include network application server software.

Virtualization layer 512 provides an abstraction layer from which the following examples of virtual entities may be provided: virtual servers; virtual storage; virtual networks, including virtual private networks; virtual applications and operating systems; and virtual clients.

In one example, management layer 514 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A defect tracking program and virtual machine provisioning program provide a monitoring of the state of a defect or work-item in a work planning tool and provisioning of a virtual machine or environment matching the current state of the defect.

Workloads layer 516 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically provisioning a virtual machine for replicating or reproducing a defect workflow stage associated with testing a software product, the method comprising:
    identifying a defect in the software product;
    identifying steps to reproduce the identified defect;
    producing an automation script to reproduce the identified defect based on the identified steps;
    identifying a plurality of relevant environmental details associated with a state of the identified defect;
    requesting, by a defect tracking system, a virtual machine provisioning system to provision a new virtual machine comprising the identified plurality of relevant environmental details along with an embedded script comprising the produced automation script;
    building, by the virtual machine provisioning system, the requested new virtual machine;
    informing, by the virtual machine provisioning system, the defect tracking system that the new virtual machine is ready and including a plurality of updated machine connection details associated with the new virtual machine and a defect description;
    requesting, by the defect tracking system, the virtual machine provisioning system to delete an original virtual machine;
    requesting, by the defect tracking system, the virtual machine provisioning system to build a new virtual machine with a nominated fixed build;
    updating, by the defect tracking system, the identified defect with a plurality of connection details associated with the new virtual machine; and
    requesting, by the defect tracking system, the virtual machine provisioning system to delete the new virtual machine.

2. The method of claim 1, wherein the identified plurality of relevant environmental details comprises at least one of an operating system; a database; an application version and a build or a plurality of other non-functional environmental prerequisites for reproducing the identified defect; a current assignee of the defect; a plurality of associated product source code changes and builds in which the plurality of associated product source code changes were included; a workflow stage of the identified defect; and one or more test-cases used to reproduce or verify the identified defect.

3. The method of claim 1, further comprising:
    adding a link or a reference to a provisioned VM in the identified defect.

4. The method of claim 3, further comprising:
    updating the added link each time the provisioned VM is re-provisioned.

5. The method of claim 1, further comprising:
    running a test-case associated with the identified defect.

6. The method of claim 5, further comprising:
    taking a virtual machine snapshot of an environment associated with the identified defect, wherein the snapshot is taken before and after the test-case is run.

7. A computer system for automatically provisioning a virtual machine for
    replicating or reproducing a defect workflow stage associated with testing a software product, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

identifying a defect in the software product;

identifying steps to reproduce the identified defect;

producing an automation script to reproduce the identified defect based on the identified steps;

identifying a plurality of relevant environmental details associated with a state of the identified defect;

requesting, by a defect tracking system, a virtual machine provisioning system to provision a new virtual machine comprising the identified plurality of relevant environmental details along with an embedded script comprising the produced automation script;

building, by the virtual machine provisioning system, the requested new virtual machine;

informing, by the virtual machine provisioning system, the defect tracking system that the new virtual machine is ready and including a plurality of updated machine connection details associated with the new virtual machine and a defect description;

requesting, by the defect tracking system, the virtual machine provisioning system to delete an original virtual machine;

requesting, by the defect tracking system, the virtual machine provisioning system to build a new virtual machine with a nominated fixed build;

updating, by the defect tracking system, the identified defect with a plurality of connection details associated with the new virtual machine; and requesting, by the defect tracking system, the virtual machine provisioning system to delete the new virtual machine.

8. The computer system of claim 7, wherein the identified plurality of relevant environmental details comprises at least one of an operating system; a database; an application version and a build or a plurality of other non-functional environmental prerequisites for reproducing the identified defect; a current assignee of the defect; a plurality of associated product source code changes and builds in which the plurality of associated product source code changes were included; a workflow stage of the identified defect; and one or more test-cases used to reproduce or verify the identified defect.

9. The computer system of claim 7, further comprising: adding a link or a reference to a provisioned VM in the identified defect.

10. The computer system of claim 9, further comprising: updating the added link each time the provisioned VM is re-provisioned.

11. The computer system of claim 7, further comprising: running a test-case associated with the identified defect.

12. The computer system of claim 11, further comprising: taking a virtual machine snapshot of an environment associated with the identified defect, wherein the snapshot is taken before and after the test-case is run.

13. A computer program product for automatically provisioning a virtual machine for replicating or reproducing a defect workflow stage associated with testing a software product, the computer program product comprising:

one or more computer-readable storage devices and program instructions stored on at least one of the one or more tangible storage devices, the program instructions executable by a processor, the program instructions comprising:

program instructions to identify a defect in the software product;

program instructions to identify steps to reproduce the identified defect;

producing an automation script to reproduce the identified defect based on the identified steps;

program instructions to identify a plurality of relevant environmental details associated with a state of the identified defect;

program instructions to request, by a defect tracking system, a virtual machine provisioning system to provision a new virtual machine comprising the identified plurality of relevant environmental details along with an embedded script comprising the produced automation script;

program instructions to build, by the virtual machine provisioning system, the requested new virtual machine;

program instructions to inform, by the virtual machine provisioning system, the defect tracking system that the new virtual machine is ready and including a plurality of updated machine connection details associated with the new virtual machine and a defect description;

program instructions to request, by the defect tracking system, the virtual machine provisioning system to delete an original virtual machine;

program instructions to request, by the defect tracking system, the virtual machine provisioning system to build a new virtual machine with a nominated fixed build;

program instructions to update, by the defect tracking system, the identified defect with a plurality of connection details associated with the new virtual machine; and program instructions to request, by the defect tracking system, the virtual machine provisioning system to delete the new virtual machine.

14. The computer program product of claim 13, wherein the identified plurality of relevant environmental details comprises at least one of an operating system; a database; an application version and a build or a plurality of other non-functional environmental prerequisites for reproducing the identified defect; a current assignee of the defect; a plurality of associated product source code changes and builds in which the plurality of associated product source code changes were included; a workflow stage of the identified defect; and one or more test-cases used to reproduce or verify the identified defect.

15. The computer program product of claim 13, further comprising:
program instructions to add a link or a reference to a provisioned VM in the identified defect.

16. The computer program product of claim 15, further comprising:
program instructions to update the added link each time the provisioned VM is re-provisioned.

17. The computer program product of claim 13, further comprising:
program instructions to run a test-case associated with the identified defect.

* * * * *